Figure 1:
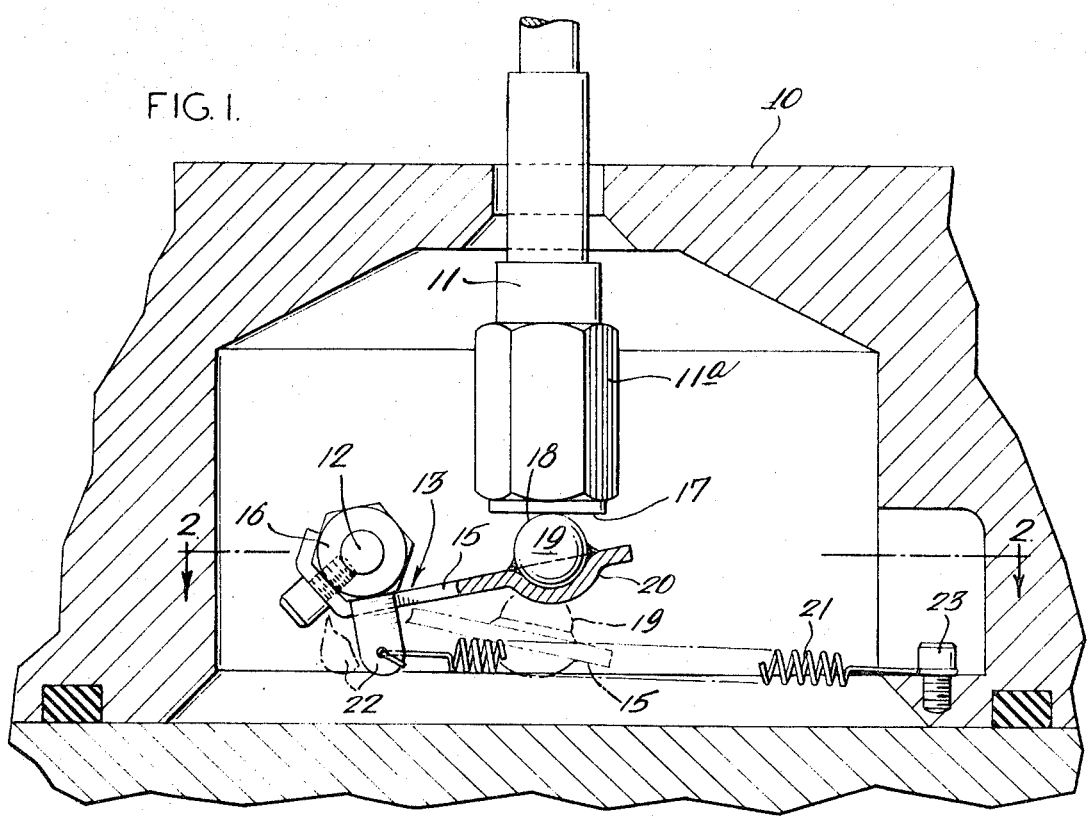

United States Patent [19]
Younger

[11] 3,745,826
[45] July 17, 1973

[54] DIFFERENTIAL PRESSURE FLOW METERS
[75] Inventor: George F. Younger, Placentia, Calif.
[73] Assignee: Kingmann-White, Inc., Placentia, Calif.
[22] Filed: June 14, 1971
[21] Appl. No.: 152,741

[52] U.S. Cl. .................................................. 73/211
[51] Int. Cl. ................................................ G01f 1/00
[58] Field of Search ...................................... 73/211

[56] References Cited
UNITED STATES PATENTS
2,762,392   9/1956   Reese .......................... 73/211 UX Primary Examiner—Jerry W. Myracle
Attorney—John W. Logan, Jr.

[57] ABSTRACT

A bellows-type flow meter operating in conjunction with an orifice plate in a conduit to sense the pressure differential across the plate and to convert the sensed pressure into angular displacement of an output shaft connected to recording instrumentation is provided with an improved linkage mechanism which operates accurately to couple the meter with readout apparatus normally used in conjunction with conventional manometer-type meters. The linkage includes an arm mounted to the output shaft and carrying adjacent its terminus a hemisphere which is biased upwardly by a spring into engagement with a flat surface provided on the bottom end of a rod connected to the bellows. The hemisphere slides relative to the rod surface upon axial displacement of the rod to cause the angular displacement of the shaft to correspond with the angular displacement of the output shaft in flow meters of the manometer type throughout the measurement range of the meter.

2 Claims, 2 Drawing Figures

3,745,826

PATENTED JUL 17 1973

INVENTOR:
GEORGE F. YOUNGER
BY Howson & Howson
ATTYS.

DIFFERENTIAL PRESSURE FLOW METERS

The present invention relates to differential pressure flow meters, and more particularly, the present invention relates to linkage mechanisms employed in ellows-type flow meters.

Before the advent of the bellows-type flow meter, manometers were used to measure the pressure differential across an orifice plate and to convert the measured pressure differential to a readout on a recording chart through suitable linkage mechanisms. In a manometer-type flow meter, a float on one leg of the manometer is connected to an arm which rotates an output shaft in response to vertical displacement of the float. The float is laterally unrestrained on the manometer fluid, thereby permitting it always to underlie its locus of attachment to the arm. As a result of this structure, certain geometrical abberations are induced in the flow meter, and the abberations are corrected by providing recording charts with appropriately modified grid lines.

Because of the widespread usage of manometer-type flow meters computers and like apparatus for measuring total flow were designed to operate in conjunction with the modified charts. Certain difficulties have arisen, however, in coupling bellows-type flow meters with the readout and computing apparatus used in conjunction with manometer-type flow meters. For instance, complex linkage arrangements have been proposed in an effort to induce in a bellows-type flow meter the geometrical abberations which were responsible for the chart modifications. At best, such linkage arrangements operate to provide accurate readouts only at certain scale locations such as mid-scale, and at other scale locations, the readouts tend to contain inaccuracies, even though relatively small in magnitude. In certain measurement applications, however, such as measuring the quantity of gas flowed through a pipe over a prolonged time period, inaccuracies as small as one-fourth of 1 percent become significant.

With the foregoing in mind, it is the primary obect of the present invention to provide a novel linkage for flow meters of the bellows type to improve the overall accuracy of the flow meter.

It is another object of the present invention to provide an improved bellows type differential pressure flow meter which is compatible with conventional recording instrumentation.

As a further object, the present invention provides a relatively simple mechanism for connecting the output shaft of a bellows-type flow meter with the bellows inside the meter.

More specifically, in the present invention a bellows-type differential pressure flow meter is provided with a linkage which connects the bellows with the output shaft of the meter so as to simulate the geometric abberations inherent in differential pressure flow meters of the manometer type. The linkage comprises a rod connected to and depending centrally from a bellows and moving vertically in response to changes in pressure measured across an orifice plate. The lower end of the rod has a flat surface normal to its axis which is engaged by an upwardly biased hemisphere carried on the end of an arm mounted on the output shaft of the meter. The hemisphere slides relative to the rod surface when the bellows moves vertically to simulate the action produced by a float in a manometer-type differential pressure flow meter. Thus, conventional recording charts and associated computational apparatus can be used with bellows-type flow meters with the same degree of accuracy obtained with manometer-type differential pressure flow meters.

Figure 2:
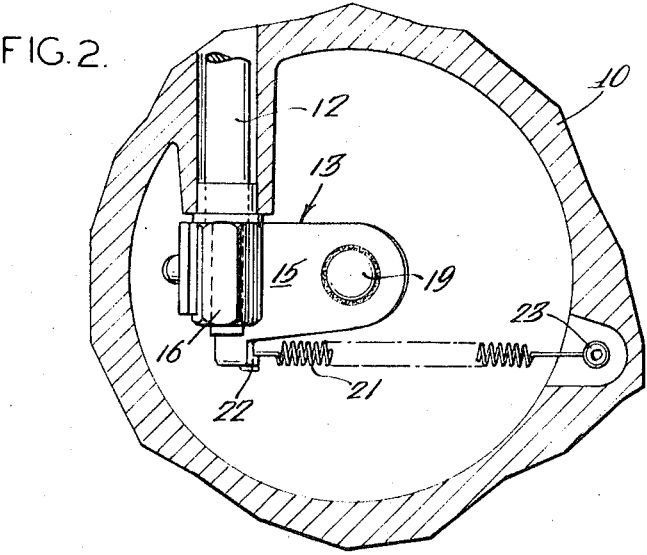

These and other objects, features, and advantages of the present invention should become apparent from the following description when taken in conjunction with the accompanying drawing in which:

FIG. 1 is an enlarged fragmentary sectional view of a bellows-type differential pressure flow meter embodying the present invention; and FIG. 2 is a sectional view taken along line 2—2 of FIG. 1.

Referring now to the drawing, there is illustrated in FIG. 1 a portion of a casing 10 of a differential pressure flow meter of the bellows type. As described more fully in U.S. Pat. No. 3,442,680, to which reference is hereby made, a vertically disposed connecting rod 11 is fastened centrally to pressure responsive means in the casing 10. In use, the rod 11 is displaced axially in response to corresponding displacement of the pressure responsive means, and the displacement of the rod 11 is transmitted to an output shaft 12 through a linkage assembly 13. In the illustrated embodiment, the output shaft 12 is disposed horizontally and is offset from the longitudinal axis of the connecting rod 11 adjacent the lower end 11a of the connecting rod 11. The shaft 12 rotates through a total angle of 22½°, 11¼° above the horizontal and 11¼° below the horizontal.

In the above mentioned patented flow meter, the lower end of the connection rod is connected through a flexible chain to a sector mounted to the output shaft of the meter. With this type of linkage, however, the output shaft is connected to the rod in a manner which maintains constant the length of the moment arm of the output shaft. As a result, the angular displacement of the output shaft for a predetermined movement of the pressure responsive means does not correspond to the angular displacement of the output shaft of a manometer-type flow meter for a corresponding movement of the manometer float, and suitable compensating means must be provided to enable conventional recording and computing apparatus to be used accurately with bellows-type flow meters of this construction.

In accordance with the present invention, the linkage assembly 13 connects the rod 11 to the output shaft 12 in a manner which eliminates the necessity for providing compensating means in bellows-type flow meters. To this end, the linkage assembly 13 includes an arm 15 carried by a collar 16 secured against rotation to the output shaft 12 by means of a threaded fastener. The arm 15 extends laterally or rightward away from the shaft 12 and terminates adjacent the lower end 11a of the connecting rod 11. In the illustrated embodiment, a first surface 17 is provided on the lower end of the rod 11 and is disposed normal to the longutidinal axis of the rod 11. Preferably, the surface 17 is polished smooth. A second surface 18 is provided on the arm 15 adjacent its terminus. As may be seen in FIG. 1 the second surface 18 is upwardly convex in at least a plane normal to the pivotal axis of the shaft 12. In the present instance the surface 18 is hemispheric and is provided by means of a sphere 19 carried in a socket 20 on the end of the arm 15. Means is provided to bias the second or convex surface 18 upwardly into engagement with the first or flat surface 17, and in the present instance the biasing is provided by an extension spring 21 hooked at one end through an eye in a lever 22 depending from the arm 15 and hooked at its other end around a screw 23 mounted in the casing 11. As may be seen in FIGS. 1 and 2, the spring 21 is located at a right angle to the shaft 12 and is offset with respect to the longitudinal axis of the connecting rod 16.

In operation, the convex surface 18 slides laterally on the flat surface 17 when the connecting rod 11 moves vertically downward, for instance from its upper limit position shown in full lines in FIG. 1 to its lower limit position shown in broken lines therein and vice versa. As a result, the turning movement applied to the shaft 12 through the arm 15 varies throughout the range of movement of the rod 11 depending on its position and thereby simulates the effect produced by the lateral migration of the float in manometer-type flow meters.

In view of the foregoing, it should be apparent that an improved linkage arrangement has now been provided to eliminate compensating apparatus heretofore necessary to couple bellows-type flow meters with readout apparatus designed for use with manometer-type flow meters.

While a preferred embodiment of the present invention has been described in detail, various modifications, alterations, and changes may be made without departing from the spirit and scope of the present invention as defined in the appended claims.

I claim:

1. In a differential pressure-responsive apparatus, including: a casing, pressure-responsive means mounted in said casing for displacement in response to pressure applied therein, a rod connected to said pressure-responsive means and mounted in said casing for axial displacement in response to said pressure-responsive means, a shaft mounted in said casing to pivot transaxially of said rod, and an arm mounted on said shaft, the improvement comprising: means providing a first surface on said rod, means providing a second surface on said arm engaging said first surface, and means biasing said surfaces into engagement with one another, one of said surfaces being flat and disposed normal to the axis of said rod and the other of said surfaces being convex in a plane normal to the pivotal axis of said shaft, said rod mounted for full stroke movement a first predetermined distance between opposite limit positions, the arm lying in a plane normal to the axis of said rod at the midpoint of the stroke of said rod, the axis of said shaft spaced from said rod a second predetermined distance, the relation of said first predetermined distance and said second predetermined distance being such that the shaft pivots approximately 11¼° in one direction as the rod moves from the midpoint of its stroke to one limit position and pivots approximately 11¼° in the opposite direction as the rod moves from the midpoint of its stroke to its other limit position whereby movement of the rod away from its position at the midpoint of its stroke in either direction causes the effective lever length of the arm to decrease a predetermined amount to measurably increase the rate of rotation of said shaft relative to the stroke of said rod as said rod moves uniformly away from its position at the midpoint of its stroke toward either limit position.

2. Apparatus according to claim 1 including a collar mounted on said shaft with said arm being connected to said collar and a threaded fastener securing said collar against rotation relative to said shaft, and wherein said biasing means includes an extension spring connected at one end in said casing and connected at its other end to said threaded fastener, said extension spring being disposed in a plane underlying the terminus of said rod.

* * * * *